(12) United States Patent
Nilsson et al.

(10) Patent No.: US 11,358,229 B2
(45) Date of Patent: Jun. 14, 2022

(54) DRILL WITH GROOVED FLUTE AND METHOD OF MAKING DRILL WITH GROOVED FLUTE

(71) Applicant: SECO TOOLS AB, Fagersta (SE)

(72) Inventors: Lars B. Nilsson, Kungsor (SE); Christian Ahlstrom, Torshalla (SE); Michael Svensson, Aby (SE)

(73) Assignee: SECO TOOLS AB, Fagersta (SE)

( * ) Notice: Subject to any disclaimer, the term of this patent is extended or adjusted under 35 U.S.C. 154(b) by 0 days.

(21) Appl. No.: 16/327,840

(22) PCT Filed: Apr. 20, 2017

(86) PCT No.: PCT/EP2017/059325
§ 371 (c)(1),
(2) Date: Feb. 24, 2019

(87) PCT Pub. No.: WO2018/036666
PCT Pub. Date: Mar. 1, 2018

(65) Prior Publication Data
US 2019/0193171 A1 Jun. 27, 2019

(30) Foreign Application Priority Data
Aug. 26, 2016 (EP) .................................. 16185956

(51) Int. Cl.
*B23B 51/02* (2006.01)
*B23B 51/04* (2006.01)

(52) U.S. Cl.
CPC ............ *B23B 51/02* (2013.01); *B23B 51/048* (2013.01); *B23B 2251/406* (2013.01); *B23B 2251/408* (2013.01); *B23B 2251/50* (2013.01)

(58) Field of Classification Search
CPC ... B23B 51/048; B23B 51/0486; B23B 51/02; B23B 2251/408; B23B 2251/406;
(Continued)

(56) References Cited

U.S. PATENT DOCUMENTS 2,322,894 A * 6/1943 Stevens .................. B23B 51/02
408/230
5,312,209 A * 5/1994 Lindblom ............... B23B 51/02
408/227
(Continued)

FOREIGN PATENT DOCUMENTS

CN 101511512 A 8/2009
DE 3826239 A1 2/1990
(Continued)

OTHER PUBLICATIONS

Machine Translation, JP2003048110 (A), Kawade et al., Feb. 18, 2003. (Year: 2003).*

*Primary Examiner* — Eric A. Gates
*Assistant Examiner* — Chwen-Wei Su
(74) *Attorney, Agent, or Firm* — Corinne R. Gorski

(57) ABSTRACT

A drill includes a drill body having a longitudinal axis, a front end, and a frontend portion and at least one flute in the front end portion. A cutting insert is mounted to the drill body in each flute of the at least one flute at the front end of the drill body. The at least one flute includes a plurality of grooves, concave surfaces of adjacent ones of the grooves intersecting to define a ridge separating the grooves.

14 Claims, 4 Drawing Sheets

(58) Field of Classification Search
CPC ............. B23B 2251/50; B23B 2251/48; Y10T 408/9095; Y10T 408/9097
See application file for complete search history.

(56) References Cited

U.S. PATENT DOCUMENTS

| | | | |
|---|---|---|---|
| 5,509,761 A * | 4/1996 | Grossman | B23B 51/0493 408/59 |
| 6,213,692 B1 | 4/2001 | Guehring et al. | |
| 2005/0053439 A1 | 3/2005 | Wang et al. | |

FOREIGN PATENT DOCUMENTS

| | | | | |
|---|---|---|---|---|
| EP | 0549548 A1 | | 6/1993 | |
| EP | 0589333 A1 | | 3/1994 | |
| JP | 2003048110 A | * | 2/2003 | |
| JP | 2016078209 A | * | 5/2016 | |
| WO | 2008046520 A1 | | 4/2008 | |
| WO | WO-2011028470 A2 | * | 3/2011 | ............. B28D 1/146 |

* cited by examiner

DRILL WITH GROOVED FLUTE AND METHOD OF MAKING DRILL WITH GROOVED FLUTE

RELATED APPLICATION DATA

This application is a § 371 National Stage Application of PCT International Application No. PCT/EP2017/059325 filed Apr. 20, 2017 claiming priority to EP 16185956.6 filed Aug. 26, 2016.

BACKGROUND AND SUMMARY

The present invention relates generally to drills and, more particularly, to drills having grooved flutes.

It is known to provide drills with replaceable and/or indexable cutting inserts at ends of flutes in drill bodies. EP 0 589 333 A1 discloses such a drill wherein the flutes of the drill are provided with recesses separated from adjacent recesses by semicircular protrusions. EP 0 549 548 A1 show another drill wherein the flutes of the drill are provided with recesses.

It is desirable to provide a drill that is simple to manufacture. It is also desirable to provide a drill that facilitates removal of chips through flutes of the drill. It is further desirable to provide a more rigid drill that may improve the usage of coolant.

According to an aspect of the present invention, a drill comprises a drill body having a longitudinal axis, a front end, and a front end portion, at least one flute in the front end portion, a cutting insert mounted to the drill body in each flute of the at least one flute at the front end of the drill body, wherein the at least one flute comprises a plurality of grooves, concave surfaces of adjacent ones of the grooves intersecting to define a ridge separating the grooves, wherein a depth of each groove of the plurality of grooves is 0.01 to 0.05 of a diameter of the front end portion of the drill body.

By providing grooves with concave surface of adjacent ones of the grooves intersecting to define a ridge separating the grooves, it is possible to minimize friction between chips flowing through the flute and the surfaces of the flute.

According to another aspect of the present invention, a method for making a drill as set forth above comprises forming at least one flute in a drill body, and milling a plurality of grooves along at least part of a length of the at least one flute so that concave surfaces of adjacent ones of the grooves intersect to define a ridge separating the grooves and so that a depth of each groove of the plurality of grooves is 0.01 to 0.05 of a diameter of the front end portion of the drill body.

By milling a plurality of grooves along at least part of a length of the at least one flute so that concave surfaces of adjacent ones of the grooves intersect to define a ridge separating the grooves, the grooved flute can be manufactured via a relatively simple milling operation without the need to form a complex geometry between adjacent grooves.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
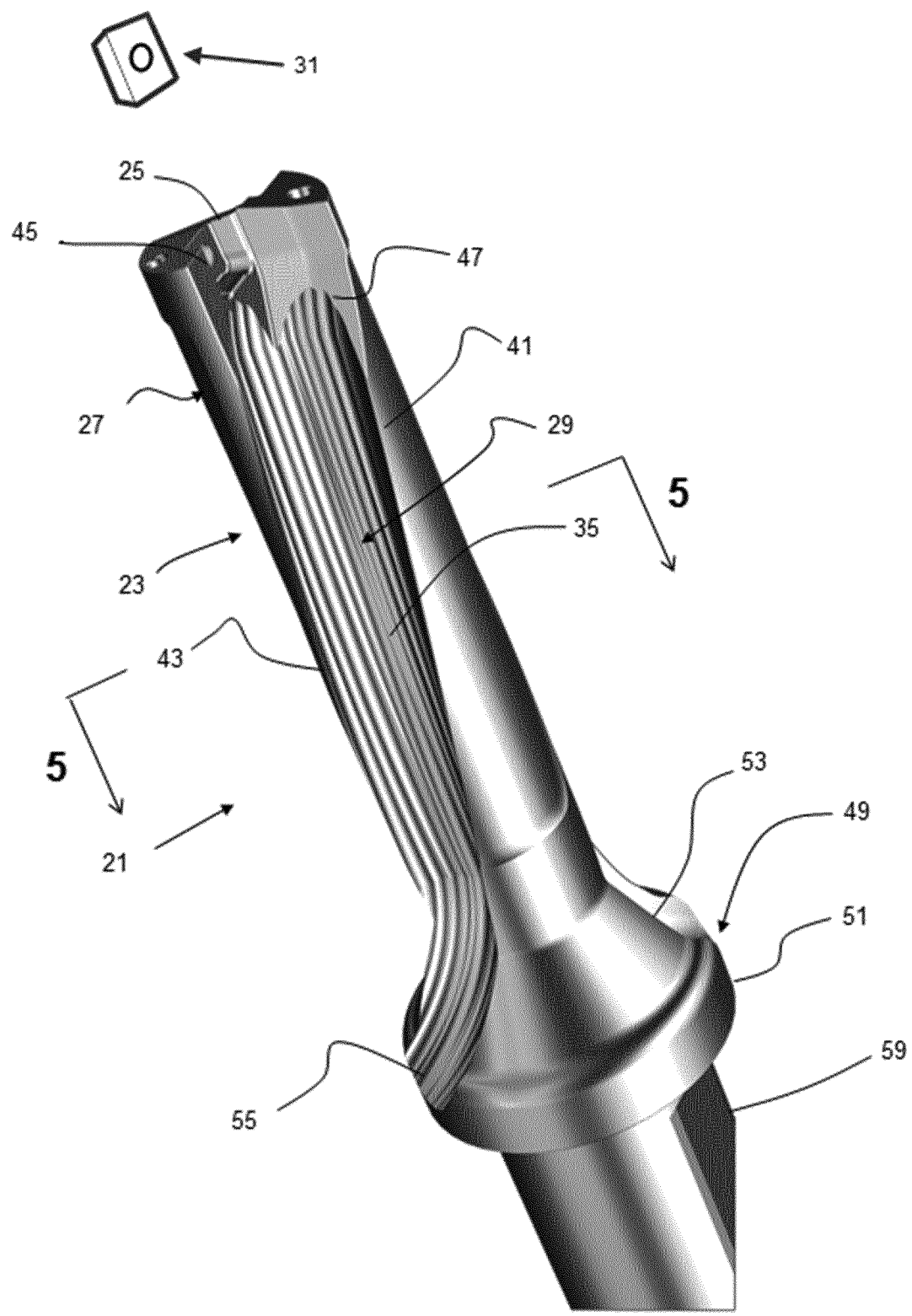
FIG. 1 is a perspective, exploded view of a portion of a drill according to an aspect of the present invention.
Figure 2:
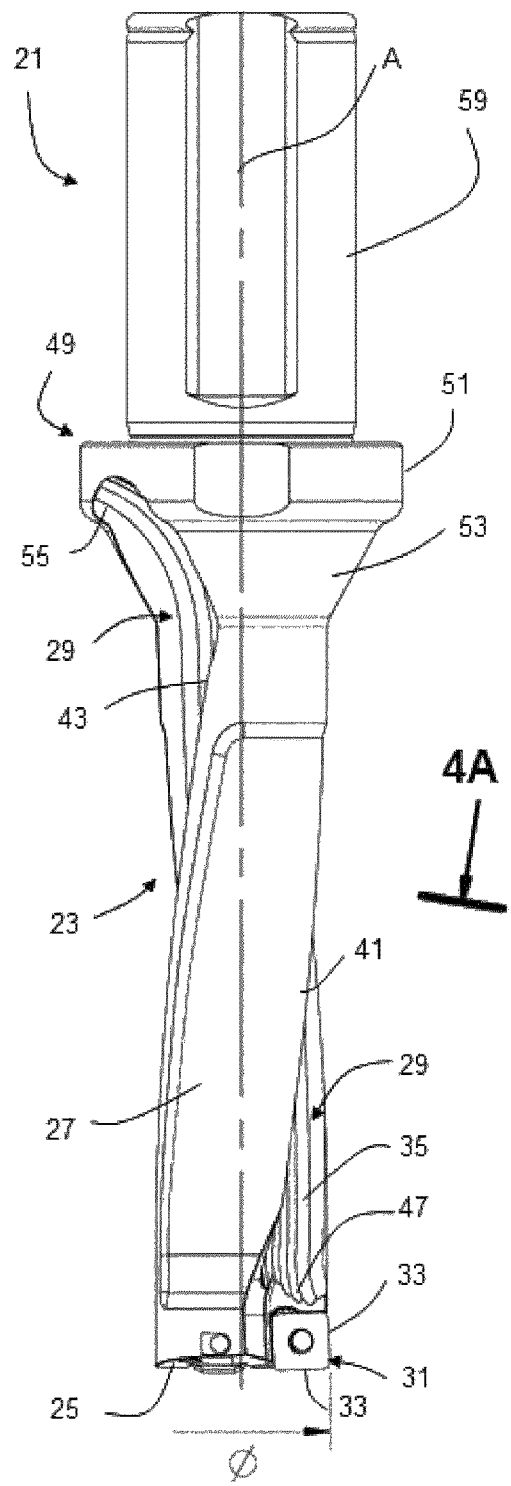
FIG. 2 is a side view of the drill of FIG. 1.
Figure 3:
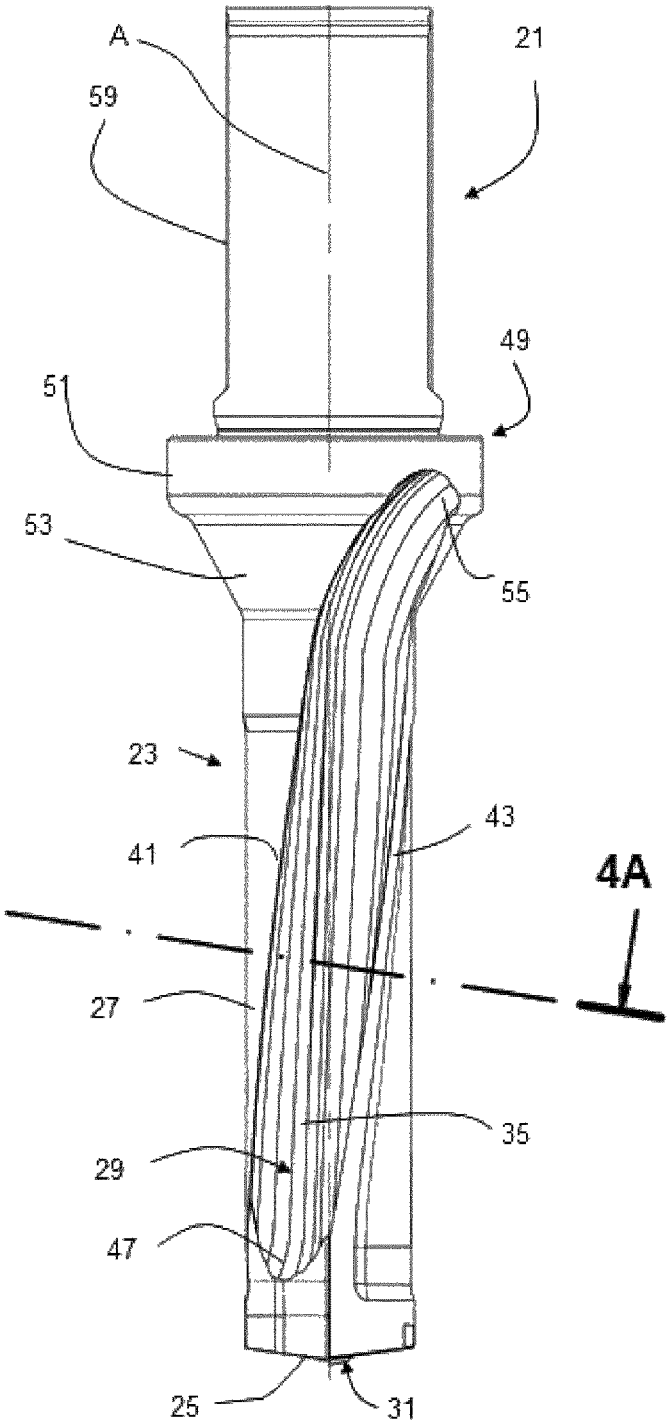
FIG. 3 is a side view of the drill of FIG. 1 rotated 90° about its longitudinal axis relative to the side view of FIG. 2.

A drill 21 according to an aspect of the present invention is shown in FIGS. 1-3. The drill 21 includes a drill body 23 having a longitudinal axis A, a front end 25, and a front end portion 27 that extends rearwardly from the front end. The front end portion 27 is generally cylindrical except to the extent that at least one flute 29 is provided in the front end portion, and possibly being provided with a margin. The embodiment shown in FIGS. 1-3 includes two flutes 29, however, more or fewer flutes may be provided in a drill according to the present invention.

As seen in FIG. 2, a cutting insert 31 is mounted to the drill body 23 in a cutting insert mounting recess 45 in each flute 29 of the at least one flute at the front end 25 of the drill body so that at least portions of one or more cutting edges 33 of the cutting insert extend beyond a profile of the drill body 23. The cutting insert 31 is preferably indexable so that, as cutting edges 33 that are exposed become worn, the cutting insert can be turned and other cutting edges can be exposed. The cutting insert 31 illustrated in FIG. 2 is a square cutting insert, however, cutting inserts with different geometries can be provided.

The flutes 29 each comprise a plurality of grooves 35. FIG. 4B shows an enlarged portion of the cross-section of the drill 21 shown in FIG. 4A and shows that concave surfaces 37 of adjacent ones of the grooves 35 intersect to define a ridge 39 separating the grooves. The ridge 39 is a sharp edge. The surfaces 37 of the plurality of grooves 35 are each curved, ordinarily over their entire length. The surfaces 37 of the plurality of grooves can be radiused.

The plurality of grooves 35 preferably define a scallop shape as seen in FIG. 4B. The scallop shape with a sharp edged ridge 39 between adjacent grooves 35 facilitates manufacture of the drill as the grooves can be formed by a simple milling operation. The sharp edged ridge 39 can facilitate evacuation of chips because there is less surface area in the flutes to cause friction with the chips. It is easier to manufacture a drill with such ridges than the prior semicircular protrusions between recesses.

Figure 4A:
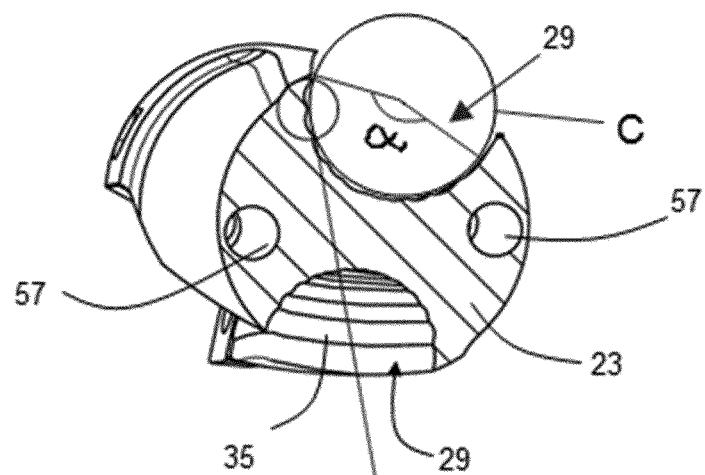
FIG. 4A is a cross-sectional view of the drill taken at section 4A-4A of FIG. 3.
Figure 4B:
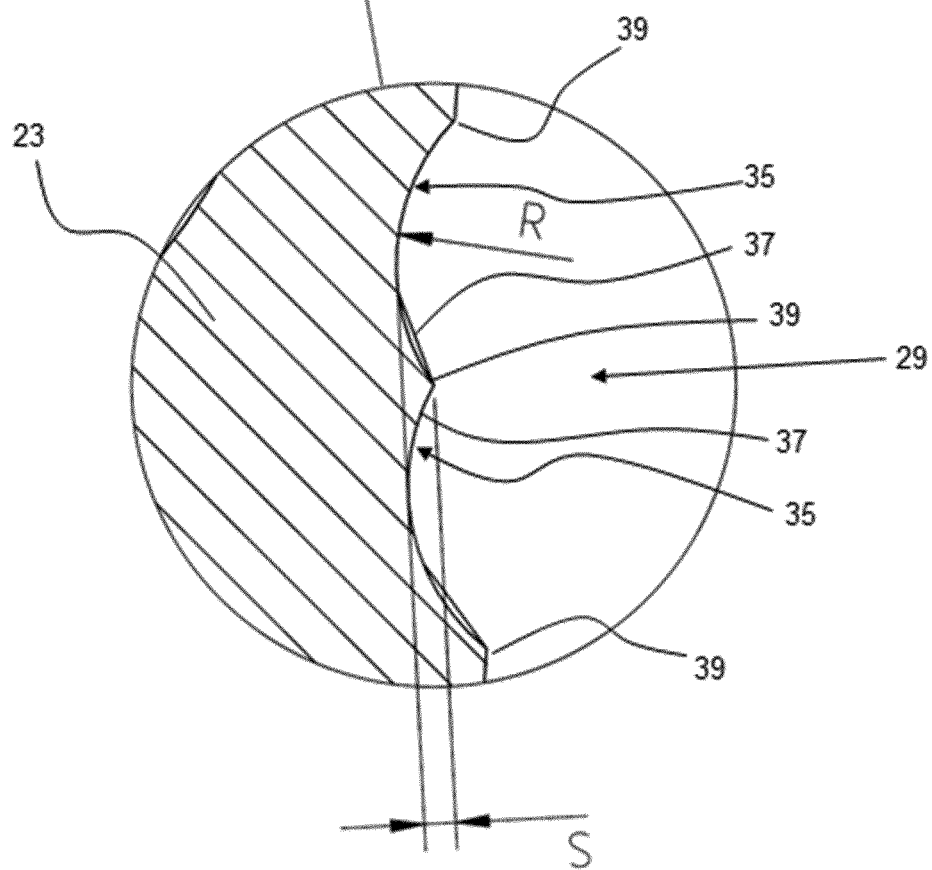
FIG. 4B is an enlarged view of a portion of FIG. 4A.

An imaginary circle or ellipse C may touch three discrete points or a majority of or all the ridges 39 in the cross-section of the drill 21 shown in FIG. 4A to define an arc of a circle or ellipse that is defined by an angle α greater than 110°, such as 150° to 185°.

The grooves 35 are ordinarily radiused as shown in FIG. 4B, and a radius R of each groove of the plurality of grooves is preferably between 0.05 and 0.20 of a diameter of the front end portion 27 of the drill body 23, preferably approximately 0.10 of the diameter of the front end portion of the drill body. For most drills for which use of the present invention is presently contemplated, the radius R of each groove of the plurality of grooves 35 is ordinarily between 1 mm and 10 mm, preferably between 1.5 mm and 6 mm. A depth S of each groove 35 of the plurality of grooves is ordinarily 0.01 to 0.05 of a diameter of the front end portion of the drill body, preferably 0.02 to 0.03 of the diameter of the drill body. For most drills for which use of the present invention is presently contemplated, the depth of the grooves is 0.1 mm to 0.5 mm, and more preferably 0.2 mm to 0.3 mm.

The flute 29 has a first edge 41 and a second edge or margin 43. The plurality of grooves 35 ordinarily extends from the first edge 41 to the second edge 43. In this way, frictional interference with transport of chips due to contact with the surface of the flute 29 can be minimized. The flute 29 is ordinarily curved, typically having a radius smaller than a radius of the front end portion 27 of the drill 21, over an entire distance between the first edge 41 and the second edge 43.

As seen, for example, in FIG. 1, the flute 29 typically includes the cutting insert mounting recess 45 at the front end 25 of the drill body 23. The cutting insert mounting recess 45 typically has a pair of side walls and a bottom surface for abutting two side surfaces of the insert 31 and bottom surface of the insert. The cutting insert 31 is typically mounted in the cutting insert mounting recess 45 via a screw that extends through a hole through the cutting insert and that mates with internal threads in a hole in the drill body 23. The cutting insert mounting recess 45 is typically configured so that, for a square cutting insert 31 as shown, a side edge or a side cutting edge 33 of the cutting insert forms a non-zero angle Φ with the longitudinal axis A of the drill body 23. Another side edge or cutting edge 33 forms the non-zero angle Φ with a perpendicular to the longitudinal axis A of the drill body.

The plurality of grooves 35 has a front end 47 adjacent the cutting insert mounting recess 45. The plurality of grooves 35 extends lengthwise along a length of the flute 29 in a same direction as the at least one flute. For example, if the flute 29 is helical as shown in FIGS. 1-3, the grooves 35 are also helical. The flute may be straight instead of helical.

As seen in FIGS. 1-3, the drill body 23 typically has a flange portion 49 including a generally cylindrical portion 51 and a converging portion 53. The generally cylindrical portion 51 has a larger diameter than the front end portion 27 of the drill body 23 and the converging portion decreases in diameter from the generally cylindrical portion to the front end portion. A rear portion 55 of the at least one flute 29 is at least partially disposed in the converging portion 53. The rear portion 55 of the at least one flute 29 is typically also at least partially disposed in the generally cylindrical portion 51. The plurality of grooves 35 typically extends to the rear portion 55 of the flute 29, i.e., into the converging portion 53 and the generally cylindrical portion 51.

Figure 5:
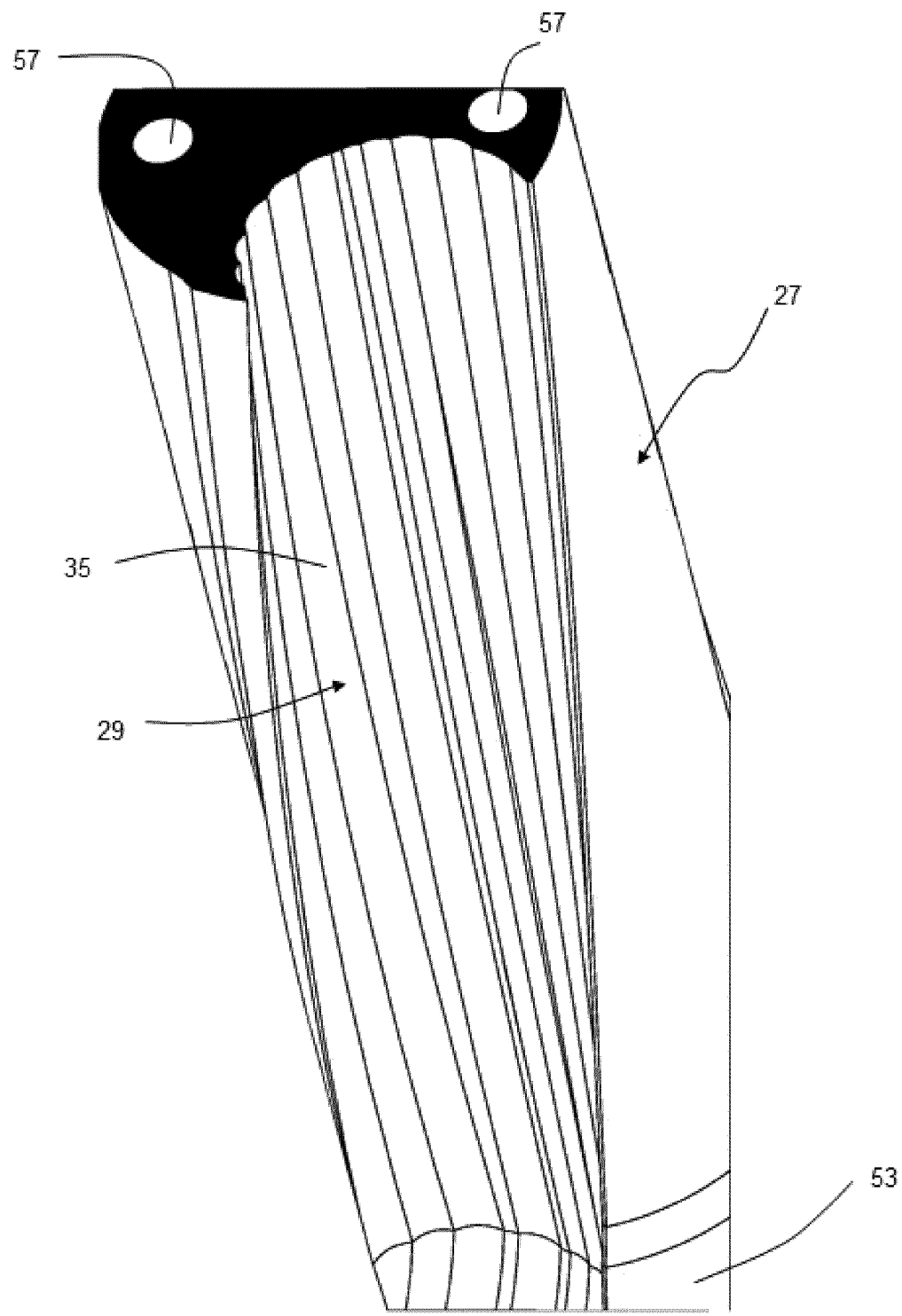
FIG. 5 is a perspective, cross-sectional view of a portion of the drill of FIG. 1 taken at section 5-5 of FIG. 1.

As seen, for example, in FIGS. 1, 4A, and 5, the drill 21 can be provided with one or more coolant/lubricant channels 57 that extend from a shank end 59 of the drill to the front end 25 of the drill, or to a point near the front end of the drill.

In a method for making a drill 21 according to an aspect of the present invention, at least one flute 29 is formed in the drill body 23. Grooves 35 are milled along at least part of a length of the at least one flute 29 so that concave surfaces 37 of adjacent ones of the grooves intersect to define a ridge 39 separating the grooves.

The area adjacent to each cutting insert mounting recess 45 may be milled by an end mill.

The flute 29 may be solely made by a smaller diameter end mill, the latter taking the entire cutting depth directly at high speed. The radius R of the scallop may be the same as a radius of the smaller end mill.

Shallower depth of the grooves relative to prior solutions makes it possible to maintain a larger core or web diameter and thereby to achieve a relatively rigid drill. Furthermore, leakage is reduced, i.e. there will be less area for the coolant to pass below the chip along the grooves so that it will lose less effect of flushing the chips out of the flute.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 16185956.6, from which this application claims priority, are incorporated herein by reference.

What is claimed is:

1. A drill comprising:
   a drill body having a longitudinal axis, a front end, and a front end portion;
   at least one flute in the front end portion; and
   a cutting insert mounted to the drill body in the at least one flute at the front end of the drill body, wherein the at least one flute includes a plurality of grooves, the plurality of grooves extending lengthwise along a length of the at least one flute and wherein concave surfaces of adjacent grooves of the plurality of grooves intersect to define a ridge separating the grooves, a depth of each groove of the plurality of grooves being 0.01 to 0.05 of a diameter of the front end portion of the drill body, wherein a radius of each groove of the plurality of grooves is between 0.05 and 0.20 of the diameter of the front end portion, wherein an imaginary circle or ellipse touches three discrete points or a majority of or all the ridge to define an arc of a circle or ellipse that is defined by an angle of 150° to 185°.

2. The drill as set forth in claim 1, wherein the depth of each groove of the plurality of grooves is 0.02 to 0.03 of the diameter of the front end portion of the drill body.

3. The drill as set forth in claim 1, wherein surfaces of each of the plurality of grooves are curved.

4. The drill as set forth in claim 1, wherein surfaces of the plurality of grooves are radiused.

5. The drill as set forth in claim 1, wherein the plurality of grooves defines a scallop shape.

6. The drill as set forth in claim 1, wherein the radius of each groove of the plurality of grooves is between 1 mm and 10 mm.

7. The drill as set forth in claim 1, wherein the at least one flute has a first edge and a second edge, and wherein the plurality of grooves extends from the first edge to the second edge.

8. The drill as set forth in claim 7, wherein the at least one flute is curved over an entire distance between the first edge and the second edge.

9. The drill as set forth in claim 1, wherein the at least one flute includes a cutting insert mounting surface at the front end of the drill body, and wherein the plurality of grooves has a front end adjacent the cutting insert mounting surface.

10. The drill as set forth in claim 1, wherein the plurality of grooves extends lengthwise along a length of the at least one flute in a same direction as the at least one flute.

11. The drill as set forth in claim 1, wherein the drill body has a flange portion including a generally cylindrical portion and a converging portion, the generally cylindrical portion having a larger diameter than the front end portion of the drill body and the converging portion decreasing in diameter from the generally cylindrical portion to the front end portion, wherein a rear portion of the at least one flute is at least partially disposed in the converging portion, and in that the plurality of grooves extends to the rear portion of the at least one flute.

12. The drill as set forth in claim 11, wherein the rear portion of the at least one flute is at least partially disposed in the generally cylindrical portion.

13. A method for making a drill according to claim 1, the method comprising the steps of:
   forming at least one flute in a drill body; and
   milling a plurality of grooves along a length of the at least one flute so that concave surfaces of adjacent ones of the grooves intersect to define a ridge separating the grooves, and so that a depth of each groove of the plurality of grooves becomes 0.01 to 0.05 of a diameter of the front end portion of the drill body.

14. The drill as set forth in claim 1, further comprising one or more coolant/lubricant channels that extend from a shank end of the drill to the front end of the drill, or to a point near the front end of the drill.

* * * * *